(12) United States Patent
Shirae

(10) Patent No.: US 6,404,410 B1
(45) Date of Patent: Jun. 11, 2002

(54) COLOR DISPLAY DEVICE

(75) Inventor: Mitsuyuki Shirae, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/293,840

(22) Filed: Apr. 19, 1999

(30) Foreign Application Priority Data

Apr. 20, 1998 (JP) .......................................... 10-125282

(51) Int. Cl.$^7$ ................................................ G09G 3/20
(52) U.S. Cl. .............................. 345/55; 345/87; 345/92
(58) Field of Search ............................. 345/55, 88, 92, 345/87, 72

(56) References Cited

U.S. PATENT DOCUMENTS

| | | | | |
|---|---|---|---|---|
| 5,311,205 A | * | 5/1994 | Hamada et al. ................ | 345/88 |
| 5,625,234 A | | 4/1997 | Suzuki et al. | |
| 5,852,485 A | * | 12/1998 | Shimada et al. ............ | 349/141 |
| 5,949,393 A | * | 9/1999 | Sakai et al. .................. | 345/174 |
| 6,028,577 A | * | 2/2000 | Sakamoto ..................... | 345/92 |

FOREIGN PATENT DOCUMENTS

| | | |
|---|---|---|
| EP | 0 691 565 A1 | 1/1996 |
| JP | 06045472 | 2/1994 |
| JP | 08087026 | 4/1997 |

* cited by examiner

Primary Examiner—Richard Hjerpe
Assistant Examiner—Kimnhung Nguyen
(74) Attorney, Agent, or Firm—Ronald P. Kananen; Rader, Fishman & Grauer PLLC

(57) ABSTRACT

A color display device has signal lines arranged approximately in columns and to be supplied with image signals separately for red, green, and blue, scanning lines arranged approximately in rows so as to cross the signal lines, and to be supplied with scanning signals, and a plurality of pixels disposed in the vicinity of the crossing portions of the signal lines and the scanning lines, and to be subjected to writing of image signals when selected according to the scanning signals. Parasitic capacitances are so formed that the amounts of image-signal-related noise entering each of the pixels from the three closest signal lines of red, green, and blue through parasitic capacitance coupling are approximately equal to each other. More specifically, the pixels have a delta arrangement in which three pixels of red, green, and blue belonging to two rows adjacent to each other are located at the apices of a triangle, and the parasitic capacitances are so formed that the amounts of noise entering each of the pixels from the three closest signal lines of red, green, and blue that are two signal lines adjacent to the pixel and located on both sides and one signal line further away are approximately equal to each other. To this end, a light shield film has an extension that overlaps with the signal line further away with the insulating film interposed in between.

2 Claims, 8 Drawing Sheets

COLOR DISPLAY DEVICE

BACKGROUND OF THE INVENTION

1. Field of the Invention

The present invention relates to an active matrix color display device in which pixels are arranged in matrix form and, more specifically, to a technique of inhibiting striped unevenness in luminance profile that appears in color display devices having delta-arranged pixels, for example.

2. Description of the Related Art

An example of a conventional active matrix color display device will be described briefly with reference to FIG. 1. As shown in FIG. 1, a color display device 0 has scanning lines 3 extending in the row direction, signal lines 2 extending in the column direction, and pixels R, G, and B of the three primary colors that are disposed in the vicinity of the crossing portions of the scanning lines 3 and the signal lines 2. The pixels R, G, and B are arranged at a predetermined pitch in the row direction. The color display device 0 also has horizontal switches HSW1, HSW2, . . . , HSWn-1, and HSWn each of which is connected to the ends of three of the signal lines 2. Each horizontal switch HSW selects the associated three signal lines 2 at the same time and writes three image signals VR, VG, and VB of the three primary colors to the corresponding three pixels R, G, and B.

FIG. 2 is a schematic diagram in which attention is paid to one pixel G. Signal lines to which image signals of green and blue are to be allocated are disposed on both sides of pixel G. A signal line to which an image signal of red is to be allocated is disposed further away. Pixel G is connected, via a switch, to the signal line to which green is allocated. An image signal of green is written to pixel G when the switch is closed, and the image signal thus written is held by opening the switch thereafter. Inactive matrix color display devices, because of their structure, there necessarily exist portions where pixel G and the signal lines on both sides overlap with each other with an insulating film interposed in between and parasitic capacitances are formed there. Therefore, even in a state that the switch is open, image-signal-related noise enters pixel G through parasitic capacitance coupling and causes a luminance variation. In particular, in the case of the structure shown in FIG. 1, while a large amount of image-signal-related noise enters pixel G from the signal lines to which green and blue are allocated, almost no image-signal-related noise enters pixel G from the signal line to which red is allocated because it is distant from pixel G.

As shown in FIG. 3, noise relating to an image signal of red (hereinafter referred to as noise R) and noise relating to an image signal of green (hereinafter referred to as noise G) enter pixel R from the signal lines on both sides. Noise G and noise relating to an image signal of blue (hereinafter referred to as noise B) enter pixel G from the signal lines on both sides. Noise B and noise R enter pixel B from the signal lines on both sides. In this manner, each pixel receives large amounts of noise corresponding to two of the three primary colors (red, green, and blue) and a small amount of noise corresponding to one of the three primary colors.

FIG. 4 is a schematic diagram showing an example of a conventional active matrix display device having what is called delta-arranged pixels. In the delta arrangement, three pixels of red, green, and blue belonging to two rows adjacent to each other (in FIG. 4, an odd-number row and an even-numbered row) are located at the apices of a triangle. These pixels are called a pixel trio, and one trio is indicated representatively by circling characters R, G, and B in FIG. 4. The resolution of the delta arrangement of FIG. 4 is about 1.5 times that of the ordinary pixel arrangement of FIG. 3.

In the delta arrangement, colors allocated to signal lines adjacent to one pixel on an odd-numbered row are different from those allocated to signal lines adjacent to one pixel of the same color on an even-numbered row. As a result, the amount of noise entering a pixel on an odd-numbered row is different from that of noise entering a pixel of the same color on an even-numbered row. Now, attention is paid to pixel G, for example. Pixel G on an odd-numbered row receives noise R and noise G but receives almost no noise B. Pixel G on an even-numbered row receives noise G and noise B but receives almost no noise R. Therefore, in a case where an image signal corresponding to green (hereinafter referred to as an image signal G) has an intermediate potential (gray level), an image signal corresponding to red (hereinafter referred to as an image signal R) has a high potential (black level), and an image signal corresponding to blue (hereinafter referred to as an image signal B) has a low potential (white level), in a normally white mode the sum of amounts of noise entering pixel G on an odd-numbered row is large and hence pixel G becomes darker. On the other hand, the total amount of noise entering pixel G on an even-numbered row is small and hence pixel G becomes brighter. Conversely, in a case where a pixel signal G has a gray-level potential, an image signal R has a white-level potential, and an image signal B has a black-level potential, the total amount of noise entering pixel G on an odd-numbered row is small and hence pixel G becomes brighter. On the other hand, the total amount of noise entering pixel G on an even-numbered row is large and hence pixel G becomes darker.

As described above, in the delta-arranged structure, unevenness in luminance profile that varies alternately with rows (hereinafter referred to as horizontal stripes) is caused by the parasitic capacitance coupling between each pixel and the signal lines adjacent thereto. This is a problem to be solved.

SUMMARY OF THE INVENTION

An object of the present invention is to inhibit unevenness in luminance profile in a color display device.

To attain the above object, a color display device comprises, as the basic configuration, signal lines, scanning lines, pixels, and color filters. The signal lines are arranged approximately in columns and are to be supplied with image signals separately for red, green, and blue. The scanning lines are arranged approximately in rows so as to cross the signal lines, and are to be supplied with scanning signals. The pixels are disposed in the vicinity of the crossing portions of the signal lines and the scanning lines, and are to be subjected to writing of image signals when selected according to the scanning signals. The color filters allocate red, green, and blue to pixels so as to associate the pixels with signal lines of red, green, and blue, respectively. As an important feature, parasitic capacitances are so formed that the amounts of image-signal-related noise entering each of the pixels from the three closest signal lines of red, green, and blue through parasitic capacitance coupling are approximately equal to each other.

More specifically, the pixels have a delta arrangement in which three pixels of red, green, and blue belonging to two rows adjacent to each other are located at the apices of a triangle, and the parasitic capacitances are so formed that the amounts of noise entering each of the pixels from the three closest signal lines of red, green, and blue that are two signal lines adjacent to the pixel and located on both sides and one signal line further away are approximately equal to each other.

Each pixel comprises a pixel electrode, a switching element for driving the pixel electrode, and a light shield film that has the same potential as the pixel electrode and overlaps with the three signal lines of red, green, and blue with an insulating film interposed in between, to thereby form the parasitic capacitances. The light shield film has an extension that overlaps with the signal line further away with the insulating film interposed in between.

According to the invention, the levels of entrance of noise R, noise G, and noise B are made approximately equal to each other. Therefore, even in the delta arrangement, the total amount of noise entering a pixel on an odd-numbered row from the signal lines has almost no difference from that of noise entering a pixel on an even-numbered row, whereby horizontal stripes can be avoided. For example, as shown in FIG. 5, with attention paid to pixel G, not only does it receive large amounts of noise G and noise B as in the conventional case but also it is adapted to receive a large amount of noise R.

DETAILED DESCRIPTION OF THE PREFERRED EMBODIMENT

An embodiment of the present invention will be hereinafter described with reference to the accompanying drawings.

Figure 6:
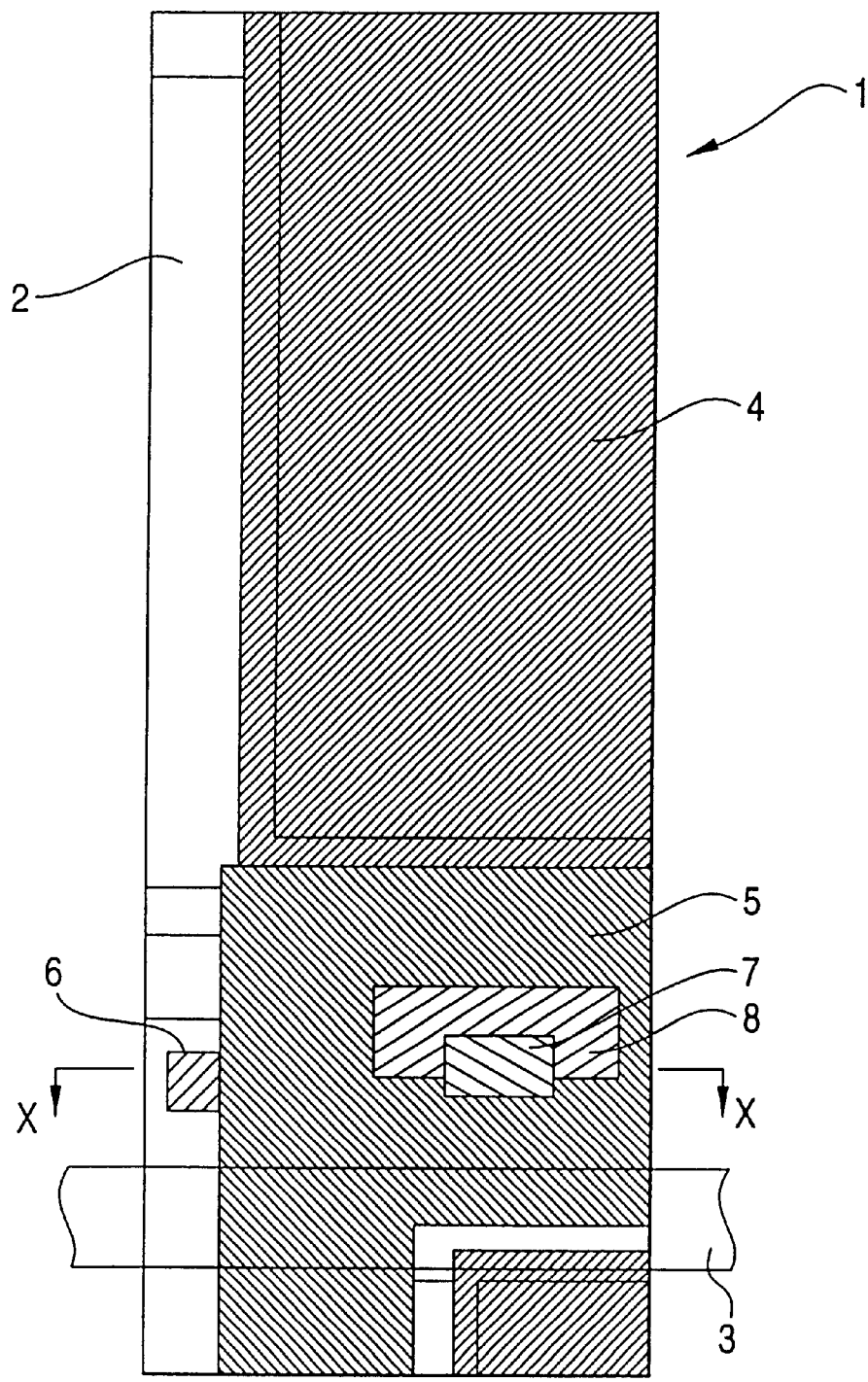
FIG. 6 is a schematic partial plan view showing a one-pixel portion of the color display device according to the invention.

FIG. 6 is a schematic partial plan view showing a one-pixel portion of a color display device according to the invention. As shown in FIG. 6, a pixel 1 is disposed in the vicinity of the crossing portion of a column-like signal line 2 made of Al, for example, and a row-like scanning line 3 made of DOPOS, for example. The pixel 1 is basically composed of a pixel electrode 4 made of ITO, for example, and a switching element for driving it. For example, the switching element is a thin-film transistor formed by using polysilicon.

In the invention, the pixel 1 further includes a light shield film 5 made of a metal Ti, for example. The light shield film 5 and the signal line 2 together cover the periphery of the pixel electrode 4 and serve as what is called a black mask. The light shield film 5 is given the same potential as the pixel electrode 4 and overlaps with the signal line 2 with an insulating film interposed in between, to form a parasitic capacitance.

Reference numeral 6 denotes a contact between the signal line 2 and the source electrode of the thin-film transistor. Reference numeral 7 denotes a contact between the light shield film 5 and the drain electrode of the thin-film transistor. Reference numeral 8 denotes a contact between the pixel electrode 4 and the light shield film 5. As is understood from the above description, the signal line 2 is connected to the source electrode of the thin film transistor via the contact 6 and the pixel electrode 4 is connected to the drain electrode of the thin film transistor via the contacts 7 and 8.

Although not illustrated in FIG. 6, the scanning line 3 is connected to the gate electrode of the thin-film transistor. Color filters made of pigment-dispersed negative resists, for example, that serve to allocate red, green, and blue to respective pixels are formed so as to be aligned with the pixel electrodes 4.

In the above structure, the overlap between the signal line 2 and the light shield film 5 mostly contributes to the parasitic capacitance between the signal line 2 and the pixel electrode 4. As described above, the signal line 2 and the light shield film 5 constitute a black mask. If they overlap with each other only in a small area, light passage may be caused by a variation in patterning, for example. To prevent such a problem, the signal line 2 and the light shield film 5 overlap with each other so as to secure a certain margin, which results in a parasitic capacitance.

Figure 7:
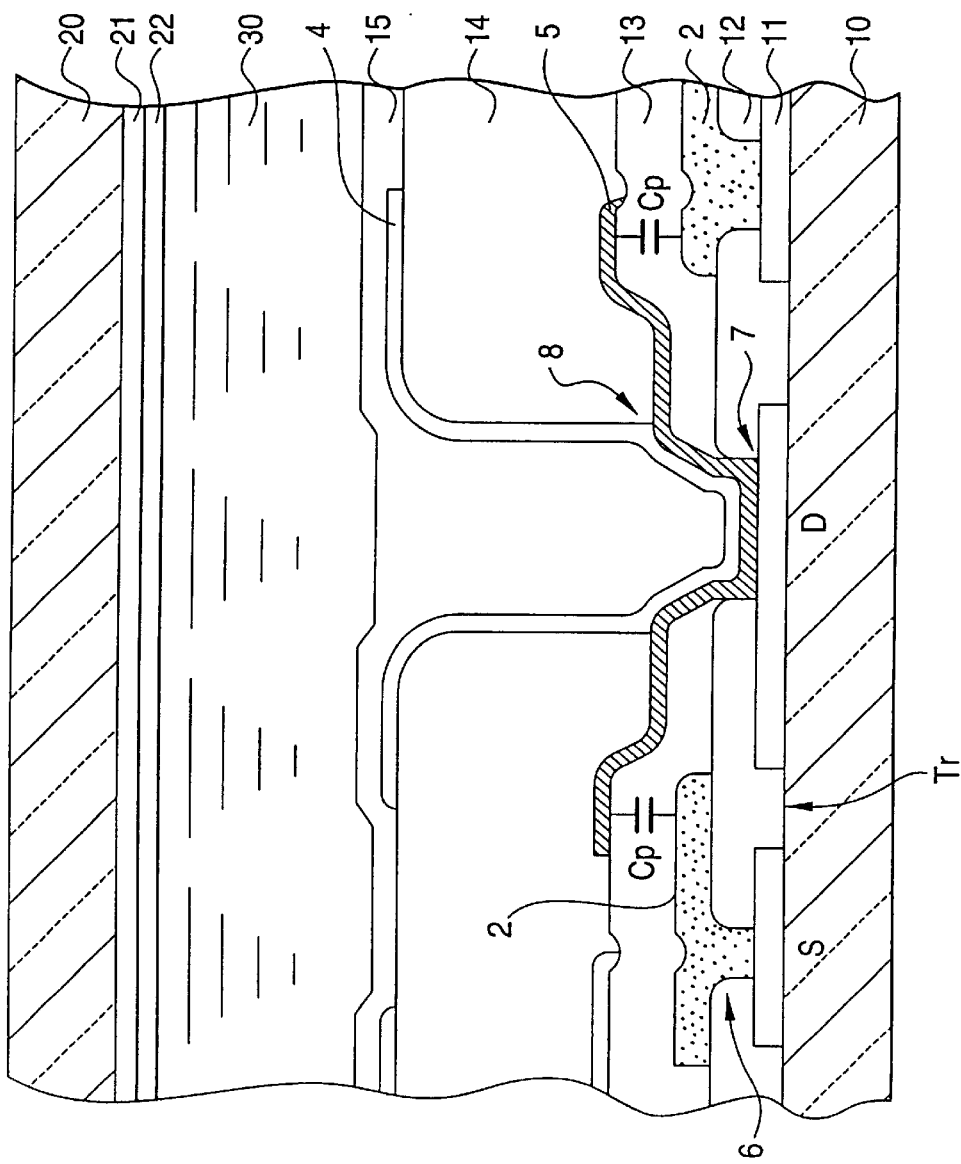
FIG. 7 is a sectional view taken along line X—X in FIG. 6.

FIG. 7 is a sectional view taken along line X—X in FIG. 6. As shown in FIG. 7, this color display device has a pair of, that is, top and bottom, substrates 20 and 10 made of glass, for example, and an electro-optical material such as a liquid crystal 30 is held between the substrates 20 and 10. An opposed electrode 21 made of ITO, for example, and an alignment film 22 made of polyimide, for example, are formed on the opposed substrate 20 side. On the other hand, the pixel electrode 4, the light shield film 5, the thin-film transistor Tr, the signal line 2, and so forth are integrated on the driving substrate 10 side.

The thin-film transistor Tr has, as a device region, a semiconductor thin film 11 of polysilicon, for example. The semiconductor thin film 11 is covered with an interlayer insulating film 12 made of phosphorus-containing silicon glass, for example. The signal line 2 made of Al, for example, is formed on the thin-film transistor Tr by patterning and electrically connected to the source electrode S of the thin-film transistor Tr via the contact 6. The signal line 2 is further covered with an interlayer insulating film 13 made of phosphorus-containing silicon glass, for example.

The light shield film 5 made of a metal Ti, for example, is formed on the interlayer insulating film 13 by patterning and electrically connected to the drain electrode D of the thin-film transistor Tr via the contact 7 that is formed through the two interlayer insulating films 12 and 13. As seen from FIG. 7, a parasitic capacitance Cp is formed by the light shield film 5 and the signal line 2 with the interlayer insulating film 13 interposed in between. The light shield film 5 is covered with a planarization film 14 made of an organic material, for example. The pixel electrode 4 is formed on the planarization film 14 by patterning and connected to the light shield film 5 via the contact 8.

Although not shown in FIG. 7, the color filters are formed in the same layer as the planarization film 14. Alternatively, color filters may be formed on the opposed substrate 20 side.

Figure 8:
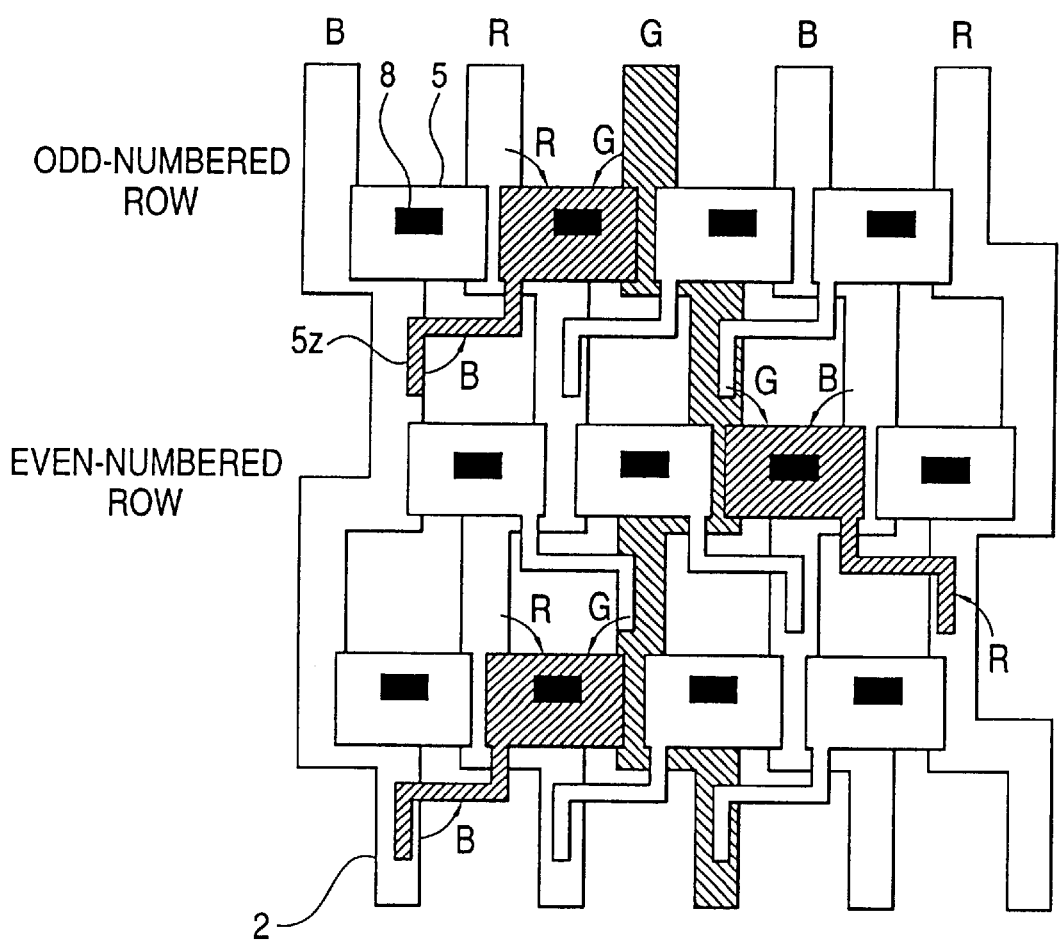
FIG. 8 is a schematic diagram showing the plan structure of the color display device of FIGS. 6 and 7.

FIG. 8 is a schematic diagram showing the plan structure of the color display device of FIGS. 6 and 7. In particular, to facilitate the understanding, the patterns of the signal lines 2 and the light shield films 5 are shown in FIG. 8. As shown in FIG. 8, this color display device employs a delta arrangement and the pixel electrodes 4 (not shown) are connected to the corresponding light shield films 5 via the contacts 8. The pixel electrode 4 is covered with the alignment film 15.

As an important feature, the parasitic capacitances are so formed that the amounts of noise entering one pixel from the three closest signal lines 2 of red, green, and blue through the parasitic capacitance coupling are approximately the same. More specifically, the delta arrangement is employed in which three pixels of red, green, and blue located at the apices of a triangle and belonging to two rows adjacent to each other (an odd-numbered row and an even-numbered row), and the parasitic capacitances are so formed that each pixel receives approximately the same amounts of noise from the signal lines of red, green, and blue, that is, the two closest signal lines located on both sides and the signal line located further away. That is, not only does each light shield film 5 overlaps with the two signal lines 2 on both sides but also it has an extension 5z that overlaps with the one signal line 2 located further away. The extension 5z is called a horizontal stripe canceler. In the structure employing the horizontal stripe cancelers, the extension of each light shield film 5 is formed so as to traverse the pixel aperture to overlap with the signal line that the light shield film 5 would not overlap otherwise, whereby the levels of entrance of noise R, noise G, and noise B are made approximately the same.

For example, as for pixel G on an odd-numbered row, the extension 5z (noise canceler) is so formed that pixel G receives noise R and noise G from the signal lines 2 on both sides but also noise B from the signal line 2 located one line further away. As for pixel G on an even-numbered row, it receives noise G and noise B from the signal line 2 on both sides and also receives noise R from the signal line 2 located one line further away via the extension 5z (horizontal stripe canceler) by approximately the same amount as noise G and noise B. The material of the extension 5z is not limited to Ti as mentioned above and opaque metals such as Al, Mo, and Cr may be used for this purpose.

Figure 9:
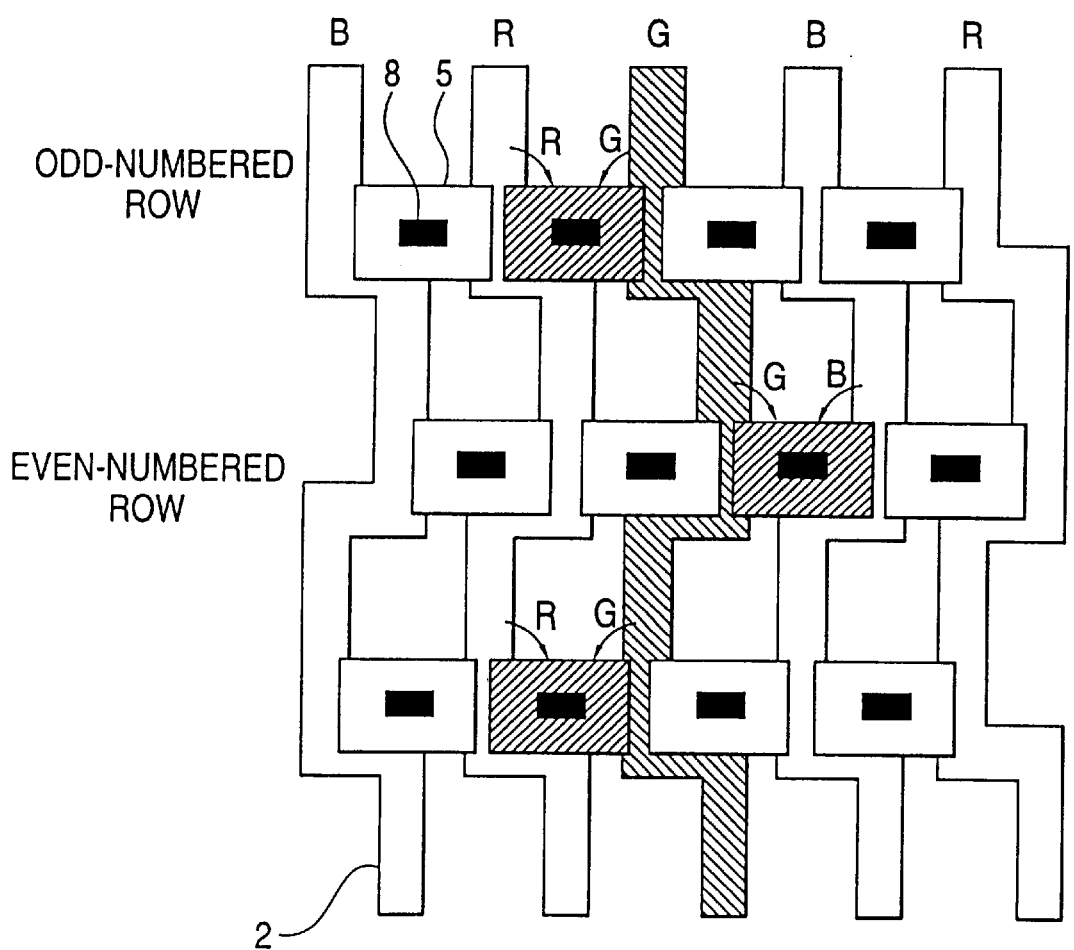
FIG. 9 is a schematic diagram showing the plan structure of a conventional color display device.

FIG. 9 is a schematic diagram showing the plan structure of a conventional color display device. To facilitate the understanding, the parts in FIG. 9 corresponding to those in FIG. 8 are given the same reference numerals as the latter. As for pixel G on an odd-numbered row, although it receives noise R and noise G from the signal line 2 on both sides, it receives almost no noise B. On the other hand, as for pixel G on an even-numbered row, although it receives noise G and noise B from the signal lines 2 on both sides, it receives almost no noise R. Depending on the hue to be displayed by a pixel, the total amount of noise entering a pixel on an odd-numbered row becomes different from that of a pixel on an even-numbered row, to cause horizontal stripes.

Figure 10:
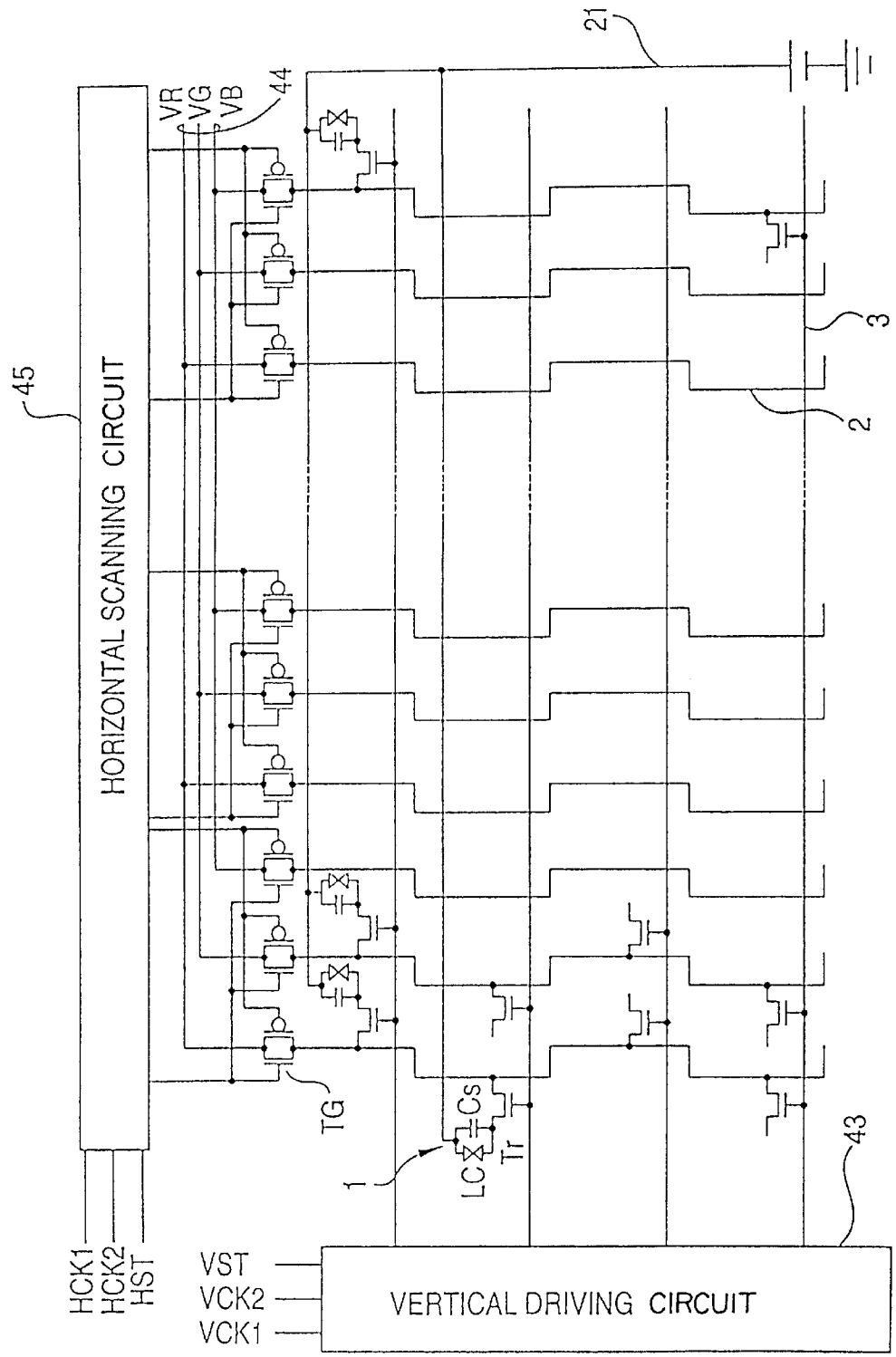
FIG. 10 is a circuit diagram showing a specific configuration example of the color display device of FIG. 8.

FIG. 10 is a circuit diagram showing a specific configuration of the color display device of FIG. 8. As shown in FIG. 10, signal lines 2 and scanning lines 3 are arranged so as to cross each other in the screen of the color display device. Pixels 1 are disposed in the vicinity of the respective crossing portions of the signal lines 2 and the scanning lines 3. Each pixel 1 is formed by a combination of a minute liquid crystal cell LC and a switching element. In this example, the switching element is a thin-film transistor Tr. The gate electrode and the source electrode of the thin-film transistor Tr are connected to the corresponding scanning line 3 and signal line 2, respectively. Its drain electrode is connected to the pixel electrode that constitutes one terminal of the corresponding liquid crystal cell LC. An opposed electrode 21 is provided to constitute the other terminal of the liquid crystal cell LC. An auxiliary capacitor Cs is connected in parallel to the liquid crystal cell LC.

A vertical driving circuit 43, which is constituted of thin-film transistors, for example, and connected to one ends of the scanning lines 3, sequentially outputs scanning signals every horizontal period in response to a start signal VST and clock signals VCK1 and VCK2 that are supplied from a timing generator. The thin-film transistors Tr are turned on in response to scanning signals (gate pulses) and thereby select pixel rows sequentially.

Figure 1:
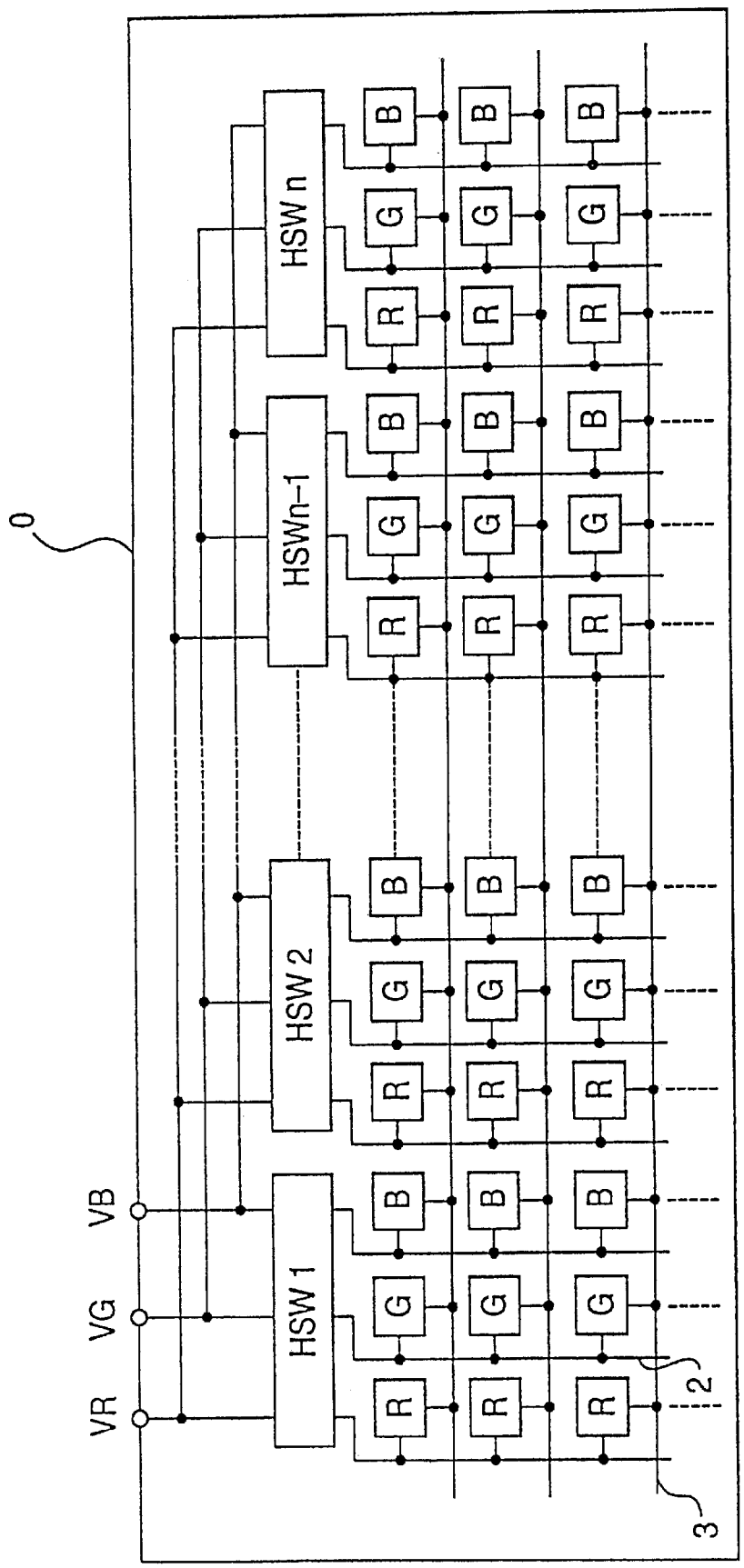
FIG. 1 is a circuit diagram showing the configuration of an example of a conventional color display device.
Figure 2:
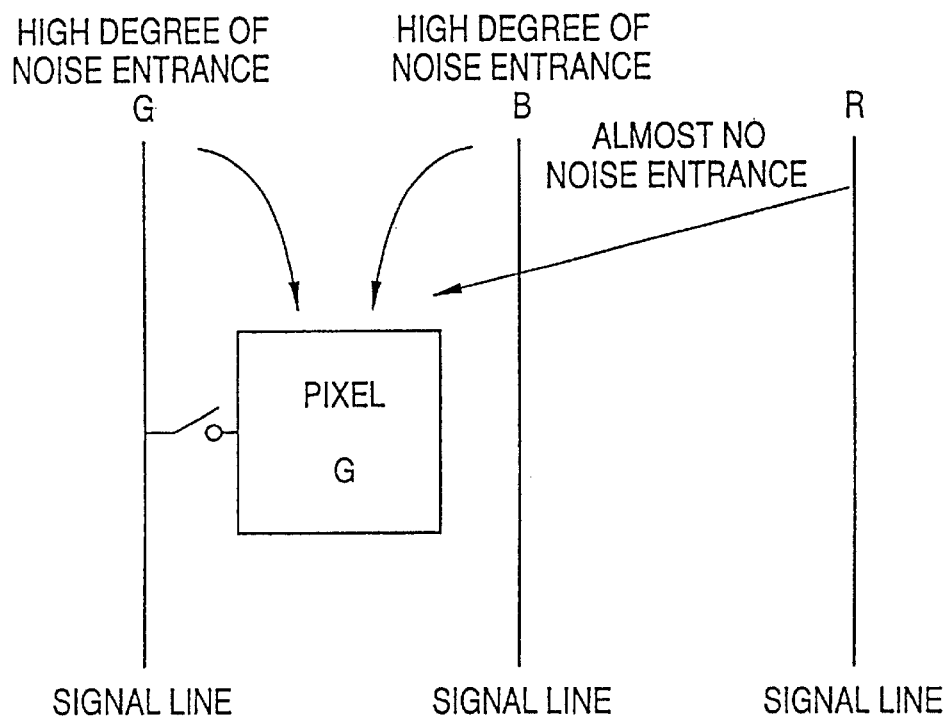
FIG. 2 is a schematic diagram illustrating how noise enters a pixel in the color display device of FIG. 1.
Figure 3:
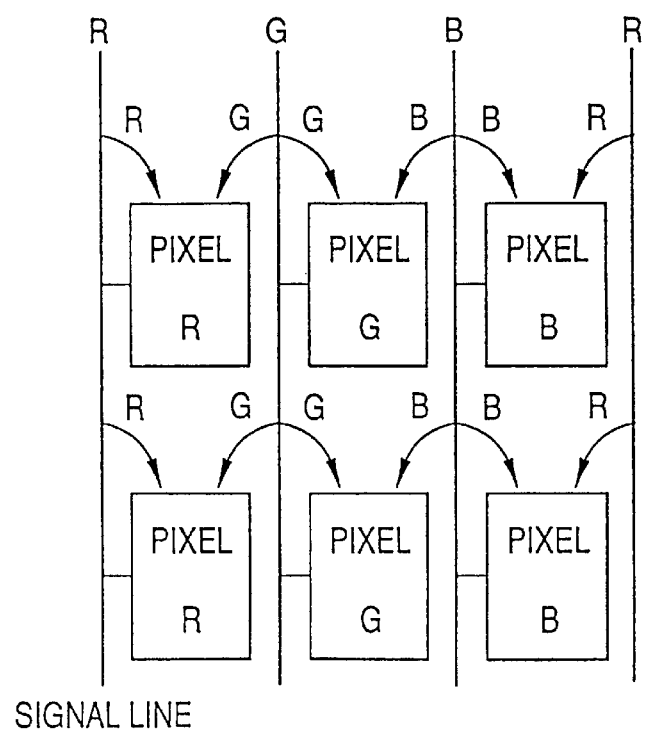
FIG. 3 is a schematic diagram illustrating how noise enters pixels in the color display device of FIG. 1.
Figure 4:
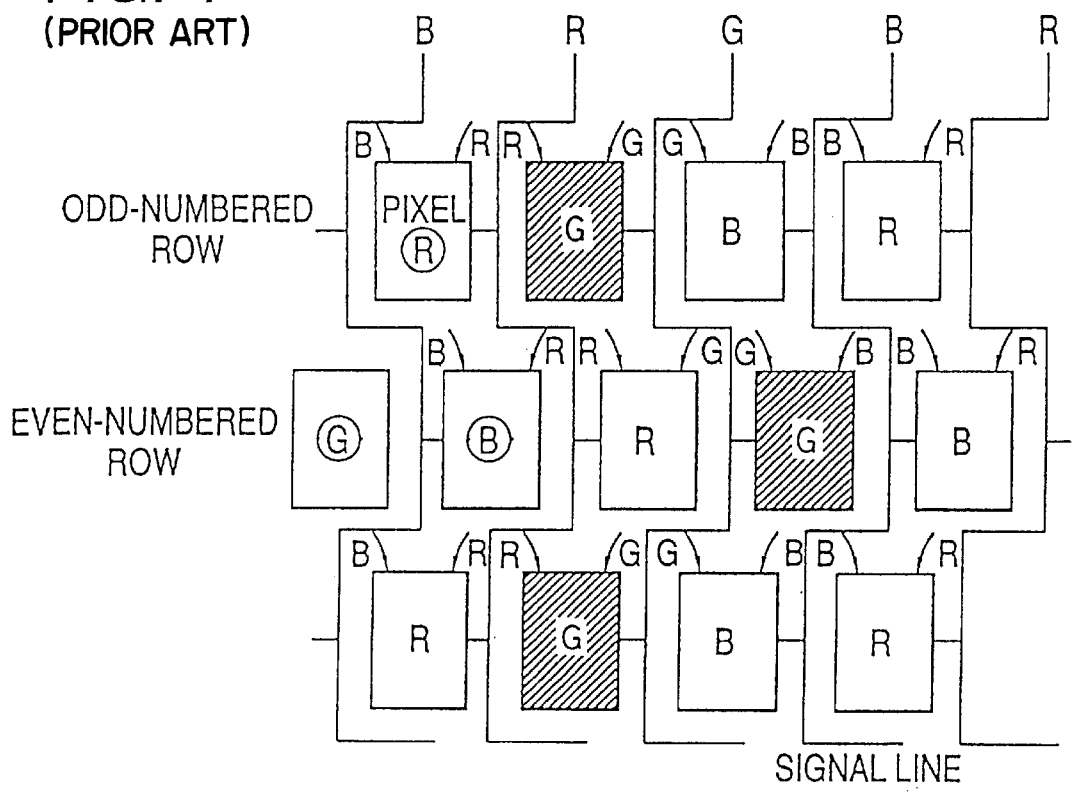
FIG. 4 is a schematic diagram illustrating how noise enters pixels in a conventional color display device having a delta arrangement.
Figure 5:
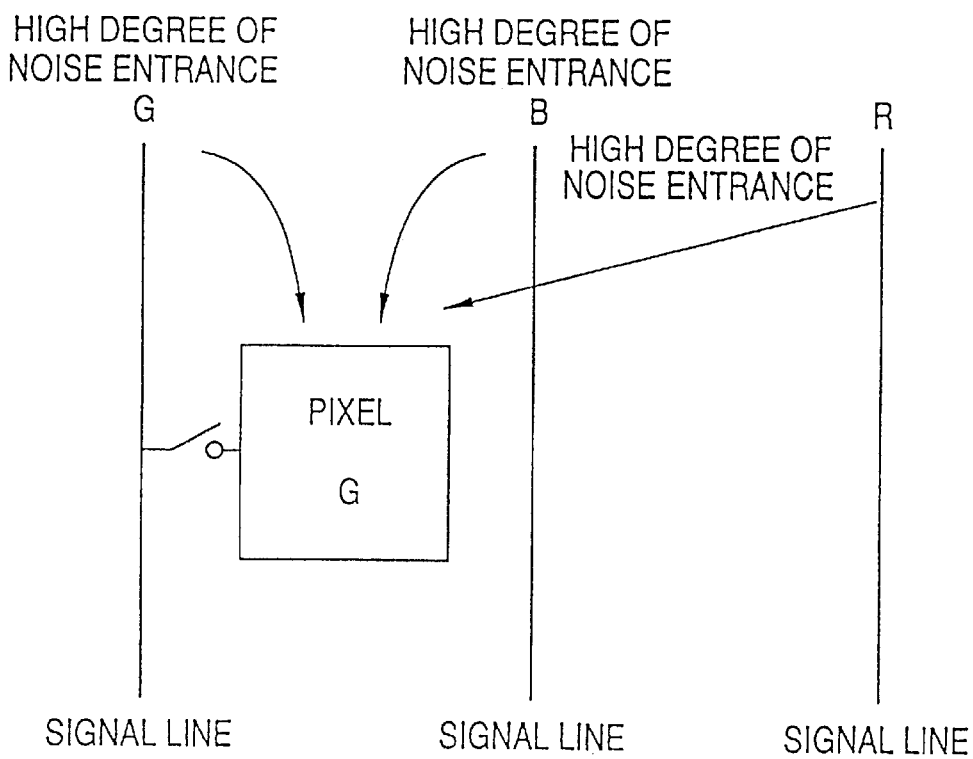
FIG. 5 is a schematic diagram illustrating the basic concept of a color display device according to the invention.

Video lines 44 made of Al, for example, are connected to the top ends of the signal lines 2 via transmission gate elements TG. The video lines 44 are three lines that are supplied with R, G, and B image signals VR, VG, and VB from drivers of the three primary colors. A set of three transmission gate elements TG constitutes a horizontal switch HSW (see FIG. 1). The opening/closing of the horizontal switches HSW is controlled by sampling pulses that are sequentially output from the horizontal scanning circuit 45 that is constituted of thin-film transistors, for example, whereby the horizontal switches HSW sample image signals VR, VG, and VB at the same time and write the image signals to the pixel columns in synchronism with the above-mentioned sequential selection of pixel rows. The horizontal scanning circuit 45 sequentially outputs sampling pulses in response to a start signal HST and clock signals HCK1 and HCK2 that are supplied from the timing generator.

As described above, in the invention, in an active matrix color display device, parasitic capacitances are so formed that the amounts of noise entering one pixel from the three closest signal lines of red, green, and blue through the parasitic capacitance coupling are approximately the same. More specifically, the delta arrangement is employed in which three pixels of red, green, and blue located at the apices of a triangle and belonging to two rows adjacent to each other, and the parasitic capacitances are so formed that each pixel receives approximately the same amounts of noise from the signal lines of red, green, and blue, that is, the two closest signal lines located on both sides and the signal line located further away. With this configuration, horizontal stripes specific to the delta arrangement can be eliminated completely. Each pixel includes a pixel electrode, a switching element for driving the pixel electrode, and a light shield film having the same potential as the pixel electrode and overlapping with the signal line to form the above-mentioned parasitic capacitance. A combination of the signal line and the light shield film constitutes what is called a black matrix. Since the amounts of noise entering the pixel electrode from signal lines are large, the horizontal stripe canceler structure of the invention is very advantageous.

What is claimed is:

1. A color display device comprising:

signal lines arranged approximately in columns and to be supplied with pixel signals separately for red, green, and blue;

scanning lines arranged approximately in rows so as to cross the signal lines, and to be supplied with scanning signals;

a plurality of pixels disposed in the vicinity of crossing portions of the signal lines and the scanning lines, and to be subjected to writing of pixel signals when selected according to the scanning signals;

color filters that allocate red, green, and blue to pixels so as to associate the pixels with signal lines of red, green, and blue, respectively; and parasitic capacitances that are formed that amounts of image-signal-related noise entering each of the pixels from the three closest signal lines of red, green, and blue through parasitic capacitance coupling are approximately equal to each other, wherein the pixels have a delta arrangement in which three pixels of red, green, and blue belonging to two rows adjacent to each other are located at apices of a triangle, and wherein the parasitic capacitances are so formed that amounts of noise entering each of the pixels from the three closest signal lines of red, green, and blue that are two signal lines adjacent to the pixel and located on both sides and one signal line further away are approximately equal to each other, and wherein each of the pixels comprises:

a pixel electrode;

a switching element for driving the pixel electrode;

a light shield film that has the same potential as the pixel electrode and overlaps with the three signal lines of red, green, and blue with an insulation film interposed in between, to thereby form the parasitic capacitances, the light shield film having an extension that overlaps with the signal line further away with the insulation film interposed in between.

2. The color display device according to claim 1, wherein the light shield film is made of metal.

* * * * *